106. COMPOSITIONS, COATING OR PLASTIC

79 Patented Nov. 21, 1939

2,180,542

UNITED STATES PATENT OFFICE 2,180,542

GLUE BASE

George H. Osgood, Tacoma, Wash.

No Drawing. Application November 27, 1937, Serial No. 176,869

5 Claims. (Cl. 134—23.8)

This invention relates to materials which may be used as a base for making adhesives especially adapted for use in the manufacture of multi-ply fabrics containing sheets of wood, and/or paper, and for other uses, and which are useful also for making plastics and for other purposes as well.

The invention comprises broadly a mixture of hemicellulose and coagulable or precipitable protein in which adhesive properties can be developed, such for example as casein, blood albumen, egg albumen, etc., and when properly made and treated it will have strong adhesive and cohesive properties approximating those of the protein, even though the protein is diluted by the hemicellulose, because the adhesive and cohesive properties of the hemicellulose are not merely additive to but are coordinated with those of the protein.

Hemicellulose derived from any suitable source may be used, and it may be incorporated as such and alone with the protein or mixed with other substances, provided, of course, that materials be not present which would have a very detrimental effect on the functioning of the product. For example, alphacellulose may be chemically converted into hemicellulose and this, while useful in my invention, is not a practical source of hemicellulose on account of the expense involved in the transformation of the alphacellulose. Hemicellulose is a compound part way between cellulose and starch, and it is present, generally having a fibrous structure, in the hulls of any of the legumes. Vetch, alfalfa seed, sweet peas, soya beans, velvet beans, in fact beans and peas of all kinds, coffee beans, horse chestnuts, and others, have in their hulls large amounts of hemicellulose, these hulls generally containing not over fifteen per cent (15%) at the most and frequently not that much of cellulose as distinguished from hemicellulose. By the term "hulls" I exclude generally the outer shells or pods, and include the skins within such outer shells or pods and around the seeds, and as an example I may refer to pea hulls as they come from pea-splitting plants the main product of which is split peas. The hemicellulose content of these hulls may run up around sixty-five per cent (65%), the starch and cellulose content together about three per cent (3%), the protein content about one-half per cent (½%) to one and one-half per cent (1½%), the fat content may run about three per cent (3%) to four per cent (4%), the moisture content about twelve per cent (12%) to fifteen per cent (15%), and small quantities of wax, sugar, ash, etc. may be present. I have not given a complete list of the various sources of hemicellulose but suffice it to say that any hulls, or in fact any other material may be tested for its hemicellulose content and used or not used accordingly. All vegetable hulls are not suitable, for example peanut hulls which are the red skins lying within the peanut shell and around the edible seed of the peanut consist practically entirely of fibrous cellulose as distinguished from hemicellulose. Many materials containing sufficient hemicellulose may be used, provided of course as above stated that there is no detrimental material therein. It is preferable to have the hulls rather finely divided for reasons which will appear hereinafter, although it is within the scope of the invention to have them less finely divided.

The protein and the hemicellulose, whether it be hemicellulose itself or hull or other material containing it, may be mixed together in any suitable manner. I may grind them together or otherwise mix them both in solid condition, but I prefer to treat finely ground hulls with milk which is a solution of casein, or with a solution of other suitable protein, so that the hull material will be impregnated with the protein solution, and then coagulate or precipitate the protein therein, thus producing a very intimate mixture. Whole milk may be used, but I prefer skim milk on account of the commercial value of the fat (butter) thereof, and I preferably but not necessarily use skim milk in which no curd has formed because curds will not penetrate the hull material and the mixture will not be as intimate a one if curd has already formed. While mere mechanical mixing of dry, finely divided hulls and dry, finely divided protein, or grinding them together, may suffice for some purposes, a more intimate mixture is obtained by the above described impregnation and the proportion of protein (casein, when skim milk is used) may be controlled by varying the relative proportion of the skim milk and the hemicellulose-containing material.

The steeping of the hulls in the skim milk usually takes anywhere from about one-half (½) to two (2) or three (3) hours or longer, the length of time actually required being dependent on the fineness of the hemicellulose-containing hulls or other material, since the finer the particles, the more readily will the milk be absorbed thereby. I prefer to grind the hulls to one hundred (100) mesh or finer. Steeping at a temperature of one hundred degrees (100°) to one hundred twenty degrees (120°) F. is a safe temperature and good shop practice. The protein coagulates at somewhere around one hundred sixty degrees (160°) to one hundred seventy degrees (170°) F., but working on a commercial scale at anywhere near the coagulating temperature requires very close supervision or very expensive apparatus to prevent a damaging temperature. As a matter of safety, I therefore recommend a temperature range of one hundred degrees (100°) to one hundred twenty degrees (120°) F.

When the hemicellulose material has thoroughly absorbed as much as it can, the mass is allowed to sour naturally or it is artificially soured by the use of a suitable acid. This souring converts the dissolved casein into precipitated curds. The methods of souring or acidifying are well known in the art of producing and treating casein and almost any acid may be used, those principally used being lactic, acetic, sulphuric, hydrochloric, etc., or rennet. I can use an amount of lactic acid amounting to four per cent (4%) to eight per cent (8%), acetic acid in an amount of about six per cent (6%), hydrochloric or sulphuric acid in amounts of three and one-half per cent (3½%) to four per cent (4%), these percentages being based on the combined weight of the protein and the hemicellulose-containing material, for example the combined weight of the hulls and of the protein in the milk, it being understood, of course, that the percentages are approximate and variable and that if the acid be strong and concentrated it should be first diluted. Considerably more acid is needed to coagulate such a mass than is necessary to coagulate an equal amount of isolated milk casein, probably due to the fact that the milk is absorbed into the fibers of the hemicellulose and a greater strength of acid or more acid is needed in order to permeate through and cause souring in all portions of the absorbed milk. Complete curdling or precipitation from solution of proteins useful in my invention, occurs when the pH of the solution indicates acidity, and enough of an acid of suitable concentration should be used to attain the desired pH throughout the absorbed solution in a commercially economical period of time. An excess of acid is desirable in order to insure not only practically complete curdling but to insure somewhat coarse curds rather than a very finely divided precipitate, because the solid product is not easily separable from the liquid with both the hulls and the precipitate in very finely divided form.

When the casein has been insolubilized the liquid portion is separated from the solids as by draining, centrifuging, vacuum filtering, or in any other suitable manner. The solid matter is frequently, but not necessarily always, treated with water to wash it, and the washing liquid may be removed in the same manner as the mother liquor. The washed, curdled mass is then spread on trays to dry, or it is dried in any other suitable manner. Heat may be applied for drying purposes but the temperature should be maintained, when operating on an industrial scale, below one hundred forty degrees (140°) F. in order not to damage the protein for gluemaking purposes. The dried material is ground to a suitable degree of fineness, say one hundred (100) mesh and it may then be used as the glue base. It may be used in place of casein or blood albumen or egg albumen for making glues, very much the same materials may be added to this base as to the protein, and the treatment of the base may be very much the same as for the protein.

Should it be so desired, the drying step may be omitted and the wet mixture of the protein with the hemicellulose or material containing hemicellulose, may be used as the glue base; and the contained moisture may replace an equal part of the water which it is necessary to add if the glue base be dry to provide the liquid vehicle.

My new glue base is generally intended for use with alkaline media, and I propose to use it frequently with media containing calcium hydroxide, sodium hydroxide, and/or silicate of soda. Not only is the strength of the resulting glue increased by the fineness of the material and by the intimacy of the mixture, but the alkaline material affects the hemicellulose by a sort of mercerizing action thereon, converting it into a gelatinous mass, but alone and without the aid of another co-solvent it does not make a simple solution thereof. The alkali affects both the protein and the hemicellulose. Its effect on the hemicellulose alone will not produce a commercial adhesive for the intended purposes but its effect on the protein will, and the total result of the alkali on both is a glue which is much stronger than one containing the same amount of the same powdered protein and an amount of powdered cellulose material equal to the amount of powdered hemicellulose material. There is some interaction or coordination or combination between the effects of the alkali on the protein and on the hemicellulose which I do not quite understand but which seems greater than the sum of both and to be increased by intimacy of admixture. For example, if forty (40) pounds of dry casein be intimately mixed mechanically with sixty (60) pounds of dry hemicellulosic material, for example hulls as above described, and the mixture be then treated with the glue-making alkaline medium, a glue results which has a very high adhesive strength, not quite as high as a glue made with one hundred (100) pounds of casein without any hemicellulosic material, but nevertheless much stronger than one made with forty (40) pounds of casein and sixty (60) pounds of cellulosic material; and there is a decided stepping up of the adhesive strength if the forty (40) pounds of casein and the sixty (60) pounds of hemicellulosic material be mixed by the impregnation and precipitation method above described which causes a much more intimate mixture.

My invention makes it possible to provide a glue having a strength approximating that of ordinary casein glue, but costing considerably less than the casein glue per unit of strength developed. For example, casein costs about two hundred eighty dollars ($280.00) per ton and pea hulls which have been used principally for sheep feed during the seasons when no forage is available, costs from twenty dollars ($20.00) to twenty-five dollars ($25.00) per ton depending on the season of the year. I can produce a glue almost as good as a very good casein glue for roughly about one-half the cost; and I can reduce the cost substantially with only a comparatively slight loss in wet strength and practically no loss in dry strength. The strength of a glue is measured by the bond between the parts glued, after completion of the work, and this may be different under wet and dry conditions. When the manufacture of wood veneer panels has been completed with a glue made from my new glue base, and the panels are ready for market in a dry condition and the strength of the bond is tested, it is found that the dry strength is very little, if any, less than that of a glue made from straight casein as a base when treated, used and tested under the same conditions. The wet strength of a glue is tested just after soaking the panels for twenty-four (24) hours in water at ordinary temperature, and it will sometimes be decreased somewhat more than the dry strength by substituting my new glue base for the straight casein base; but the loss of wet strength is not sufficient to interfere to a great extent with the advantageous use of glues made from my new base. The wet strength is variable, and increases with the proportion of protein to hemicellulose material, while the dry strength remains fairly constant at about the dry strength of a glue made with straight protein as the base. I therefore can adjust the proportions in the new base to give the desired wet strength, knowing that the dry strength will remain at about constant. Dry strength is always important and wet strength is only sometimes so, so that I can adjust the proportions of my new base to those most economical for the particular wet strength required in the particular case, and in many instances I can make a glue comparable to soya bean or other vegetable protein base glues as to cost, and to milk casein or blood albumen base glues as to dry and wet strengths. One hundred (100) pounds of skim milk will produce from three (3) to three and three-tenths (3.3) pounds of dry casein (milk protein) and it therefore becomes a matter of calculation to determine how much skim milk and how much of the hemicellulose material to use to get a mass having any desired proportions of each. The proportions of protein and hemicellulose material may, for example, be about one (1) to one (1) by weight, that is about fifty per cent (50%) of each, varying from this ratio to about two (2) parts by weight of either to one (1) of the other. These figures are given merely by way of example because a glue base outside of this range would still be my invention although a glue base less than one-third (⅓) of which is protein might not be required by the trade very often, it being remembered however that the dry strength of a glue comprising my new base in the proportion of one (1) by weight of protein to two (2) of hemicellulose, and an alkaline medium, has a dry strength about equal to that of a glue made similarly from a straight protein base.

A prior art glue having the following formula:

| | Pounds |
|---|---|
| Water | 300 |
| Milk casein | 100 |
| Hydrated lime (calcium hydroxide) | 10 |
| Caustic soda (sodium hydroxide) | 10 |
| Silicate of soda of 40° Bé | 30 |
| Copper chloride (CuCl$_2$) | 2 | gives a bond which is very strong, both as to dry and wet strength, namely a dry strength of two hundred (200) pounds per square inch and a wet strength of one hundred fifty-five (155) pounds per square inch. I can substitute for the one hundred (100) pounds of milk casein, one hundred (100) pounds of my new glue powder base, consisting for example of forty per cent (40%) milk casein and sixty per cent (60%) of pea hulls, leaving the formula otherwise the same and obtain a glue having a dry strength of about one hundred ninety (190) pounds per square inch and a wet strength of about eighty-five (85) pounds per square inch.

I can substitute for the one hundred (100) pounds of milk casein one hundred (100) pounds of my new glue powder base consisting of sixty-five per cent (65%) milk casein and thirty-five per cent (35%) of pea hulls and obtain a glue having a dry strength of about two hundred (200) pounds per square inch and a wet strength of about one hundred forty (140) pounds per square inch.

Some other useful glue formulae are:

| | Parts |
|---|---|
| Water | 330 |
| Glue powder base | 100 |
| Hydrated lime | 10 |
| Caustic soda | 10 |
| Sodium silicate | 30 |

| | Parts |
|---|---|
| Water | 300 |
| Glue powder base | 100 |
| Hydrated lime | 20 |
| Sodium silicate | 40 |
| Copper chloride (CuCl$_2$) | 2 |

| | Parts |
|---|---|
| Water | 300 |
| Glue powder base | 100 |
| Hydrated lime | 10 |
| Caustic soda | 10 |

I have referred principally to milk casein as the protein in my new glue base for the sake of describing the procedure. Blood albumen has been found to be a very good base for glues, having great dry and wet strengths, and it may be used in my invention, suitably mixed with the hemicellulose or hemicellulose-containing materials. It is suitable for dry mixing, for example sixty (60) pounds of dry blood albumen may be cracked between rolls to comminute it and it may then be mixed with forty (40) pounds of the hemicellulose-containing pea or other hulls. The blood albumen may also be incorporated with the hemicellulose by an impregnation process as above described, that is it may be dissolved in a suitable solvent, for example ammonia water, the hulls (hemicellulose) soaked in the solution, and a precipitant or coagulant of the blood albumen, such for example as a weak acid or a weak solution of a strong acid, added after proper impregnation.

I may use commercial egg albumen which is a dry product. It is dissolved in water, and a mild alkali such as ammonia or a weak solution of sodium or potassium hydroxide may be added or formed in situ to thicken the solution and make it more viscous when this is desired. After impregnation it may be coagulated or precipitated by heat or by the addition of acid as described with respect to milk casein. In fact any protein having or capable of developing the proper adhesive and cohesive characteristics may be mixed dry with the hemicellulose or hemicellulose-containing material; and any soluble, precipitable or coagulable protein having or capable of developing these characteristics may be mixed with the hemicellulose or hemicellulose-containing material by impregnating it with a solution of such protein and then precipitating or coagulating the protein.

The sodium silicate referred to herein may be commercial solutions known as water glass of different commercial strengths, that usually preferred having a density of about 40° Bé.

The mixture of casein, blood albumen, or other similar protein, or mixtures thereof, with the hemicellulose-bearing hulls or other source of hemicellulose is the glue base, and when in powdered form is the glue base powder referred to in the examples above.

The alkaline medium of the glue gelatinizes the hemicellulose into a more or less swelled mass. Suitable solvents or co-solvents may be included in the glue composition to produce a further solvent action on the hemicellulose. Any of the quaternary ammonium hydroxides having the general formula $NR_1R_2R_3R_4OH$, wherein $R_1$, $R_2$, $R_3$ and $R_4$ each represents an organic substituted-ammonia-forming radical, will help dissolve and convert the hemicellulose into a cellulose ester or compound. Carbon bisulphide also functions as a hemicellulose solvent in the presence of the caustic soda. Together, they viscosize the hemicellulose and also any cellulose present, and these are regenerated, when the glue dries, to the original materials, for which an acid medium is ordinarily needed and this is supplied by the wood. There may be other additions to or modifications of glues made from my new glue bases, which need not be described herein since the present invention relates to the glue bases comprising the co-ordinated glue protein and hemicellulose and to the methods of preparing them.

For the purpose of describing my invention I have referred to certain details which may be varied without departing from the spirit of the invention.

Copper sulphate ($CuSO_4$) may be substituted in equivalent quantities for the cupric chloride indicated in the examples.

What I claim is:

1. The method of making a glue base, which comprises soaking material very rich in hemicellulose in a solution of a precipitable protein and precipitating said protein in said material.

2. The method of making a glue base, which comprises soaking hemicellulose-bearing hulls in milk and precipitating the casein dissolved therein in said hulls.

3. The method of making a glue base, which comprises soaking hemicellulose-bearing hulls in skim milk and precipitating the casein dissolved therein in said hulls.

4. As a substitute for protein of the class consisting of milk casein, blood albumin and egg albumin, to be used as a solid adhesive element of a glue base with an aqueous alkaline medium, a composition consisting essentially of said protein and hulls separated from seeds and rich in hemicellulose, said hulls being impregnated with said protein in precipitated condition.

5. As a substitute for milk casein to be used as a solid adhesive element of a glue base with an aqueous alkaline medium, a composition consisting essentially of said milk casein and hulls separated from seeds and rich in hemicellulose, said hulls being impregnated with said milk casein in precipitated condition.

GEORGE H. OSGOOD.